United States Patent
Peled et al.

(10) Patent No.: US 7,991,751 B2
(45) Date of Patent: Aug. 2, 2011

(54) METHOD AND A SYSTEM FOR INFORMATION IDENTIFICATION

(75) Inventors: Ariel Peled, Even-Yehuda (IL); Ofir Carny, Kochav-Yair (IL); Lidror Troyansky, Givataim (IL)

(73) Assignee: PortAuthority Technologies Inc., San Diego, CA (US)

(*) Notice: Subject to any disclaimer, the term of this patent is extended or adjusted under 35 U.S.C. 154(b) by 632 days.

(21) Appl. No.: 10/815,764

(22) Filed: Apr. 2, 2004

(65) Prior Publication Data

US 2004/0199490 A1   Oct. 7, 2004

Related U.S. Application Data

(60) Provisional application No. 60/459,372, filed on Apr. 2, 2003.

(51) Int. Cl.
   *G06F 17/00* (2006.01)
   *G06F 7/00* (2006.01)
(52) U.S. Cl. .................................. 707/698; 707/602
(58) Field of Classification Search ............ 707/1–10, 707/100–104.1, 200–205, 602, 698; 713/100–250
   See application file for complete search history.

(56) References Cited

U.S. PATENT DOCUMENTS

| 6,233,589 | B1* | 5/2001 | Balcha et al. ............ 1/1 |
| 7,107,464 | B2* | 9/2006 | Shapira et al. ............ 726/15 |
| 7,143,290 | B1* | 11/2006 | Ginter et al. ............ 713/176 |
| 2002/0107877 | A1* | 8/2002 | Whiting et al. ............ 707/204 |
| 2003/0056139 | A1* | 3/2003 | Murray et al. ............ 714/4 |
| 2003/0154399 | A1* | 8/2003 | Zuk et al. ............ 713/201 |
| 2004/0068526 | A1* | 4/2004 | Singh ............ 707/203 |
| 2005/0132070 | A1* | 6/2005 | Redlich et al. ............ 709/228 |

* cited by examiner

*Primary Examiner* — Mohammad Ali
*Assistant Examiner* — Navneet K Ahluwalia

(57) ABSTRACT

A method for detecting an information item within an information sequence obtained from a digital medium, the information item comprising any one of a specified set of prestored information items, comprises: transforming each of the set of prestored information items into a respective representation, in accordance with a predetermined transformation format; transforming the information sequence obtained from the digital medium, in accordance with the transformation format; and determining the presence of one or more of the prestored information items within the transformed information sequence, utilizing the respective representation.

49 Claims, 6 Drawing Sheets

METHOD AND A SYSTEM FOR INFORMATION IDENTIFICATION

CROSS-REFERENCE TO RELATED APPLICATIONS

This application is related to and claims priority from U.S. Provisional Patent Application No. 60/459,372, filed Apr. 2, 2003, the contents of which are hereby incorporated herein by reference in their entirety.

FIELD OF THE INVENTION

The present invention relates generally to the field of analysis of digital information. More specifically, the present invention deals with methods for fast identification of information items within electronic traffic and digital media.

BACKGROUND OF THE INVENTION

The information and knowledge created and accumulated by organizations and businesses are most valuable assets. As such, managing and keeping the information and the knowledge inside the organization and restricting its distribution outside is of paramount importance for almost any organization, government entity or business and provides a significant leverage of its value. Most of the information in modern organizations and businesses is represented in a digital format. Digital content can be easily copied and distributed (e.g., via e-mail, instant messaging, peer-to-peer networks, FTP and web-sites), which greatly increase hazards such as business espionage and data leakage. It is therefore essential to monitor the information traffic in order to keep the information unavailable to unauthorized persons.

Various bills and regulations within the United States of America and other countries impose another level of importance to the problem of confidential information management and control. Regulations within the United States of America, such as the Health Insurance Portability and Accountability Act (HIPPA), the Gramm-Leach-Bliley act (GLBA) and the Sarbanes Oxley act (SOXA) implies that the information assets within organizations should be monitored and subjected to an information management policy, in order to protect clients privacy and to mitigate the risks of a potential misuse and fraud. In particular, the existence of covert channels of information, which can serves conspiracies to commit fraud or other illegal activities, pose severe risk from both legal and business perspectives.

Another aspect of the information management problem is to make the information explicitly available to authorized persons whenever needed, so that it can be utilized in order to create value for the organization. This aspect also requires tracking the information along its life cycle.

Methods that attempt to track digital information and manage information and knowledge exist. One of the most prevalent methods is based on key-words and key-phrases filtering: in this case, the system attempts to recognize a pre-defined set of previously stored information items, such as key-words, numbers and key-phrases, within the content, utilizing string comparison algorithms. Such methods are in wide usage, e.g., for email filtering utilizing string matching. However, and the usage of such methods may become prohibitively slow when the number of stored information items is large.

There is thus a recognized need for, and it would be highly advantageous to have, a method and system that allow fast and efficient recognition of large number of keywords and key phrases within electronic traffic, which will overcome the drawbacks of current methods as described above.

SUMMARY OF THE INVENTION

It is an object of the present invention to provide a method and a system that facilitates fast and efficient detection and identification of a large number of previously stored information and data items, such as words, key-phrases, credit-card numbers, social security numbers, names, addresses, email address, account numbers, and other strings within electronic traffic.

According to a first aspect of the present invention, a method for detecting an information item within an information sequence obtained from a digital medium is presented. The information item comprising any one of a specified set of prestored information items, comprising:

transforming each of the set of prestored information items into a respective representation, in accordance with a predetermined transformation format;

transforming the information sequence obtained from the digital medium, in accordance with the transformation format;

determining the presence of one or more of the prestored information items within the transformed information sequence, utilizing the respective representation.

In a preferred embodiment of the present invention the method further comprising storing the representations in a information or database.

In another preferred embodiment of the present invention the method further comprising sorting the representations into a sorted list.

In another preferred embodiment of the present invention the sorting is in accordance with a tree-sorting algorithm.

In another preferred embodiment of the present invention, the information item comprises a single word.

In another preferred embodiment of the present invention the information item comprises a sequence of words.

In another preferred embodiment of the present invention the information item comprises a delimited sequence of sub-items.

In a preferred embodiment of the present invention each of the sub-items comprises a sequence of alphanumeric characters.

In another preferred embodiment of the present invention, a type of the information item comprises one of a group of types comprising: a word, a phrase, a number, a credit-card number, a social security number, a name, an address, an email address, and an account number.

In another preferred embodiment of the present invention the information sequence is provided over a digital traffic channel.

In another preferred embodiment of the present invention the digital traffic channel comprises one of a group of channels comprising: email, instant messaging, peer-to-peer network, fax, and a local area network.

In another preferred embodiment of the present invention, the information sequence comprises the body of an email.

In another preferred embodiment of the present invention, the information sequence comprises an email attachment.

In another preferred embodiment of the present invention the method further comprising retrieving the information sequence from a digital storage medium.

In another preferred embodiment of the present invention the digital storage medium comprises a digital cache memory.

In another preferred embodiment of the present invention the representation depends only on the textual and numeric content of the information item.

In another preferred embodiment of the present invention the transforming comprises Unicode encoding.

In another preferred embodiment of the present invention the transforming comprises converting all characters to upper-case characters or to lower-case characters.

In another preferred embodiment of the present invention the transforming comprises encoding an information item into a numeric representation.

In another preferred embodiment of the present invention the method further comprising applying a first hashing function to the representations.

In another preferred embodiment of the present invention the information sequence comprises sub-sequences.

In another preferred embodiment of the present invention the sub-sequences are separated by delimiters.

In another preferred embodiment of the present invention the sub-sequences separated by delimiters are any of: words; names, and numbers.

In another preferred embodiment of the present invention the method further comprising scanning the information sequence to identify the sub-sequences.

In another preferred embodiment of the present invention the determining is performed by matching the information item to an ordered series of the sub-sequences.

In another preferred embodiment of the present invention the method further comprising applying a policy upon the detection of the information item in the information sequence.

In another preferred embodiment of the present invention the policy is a security policy, the security policy comprises at least one of the following group of security policies: blocking the transmission, logging a record of the detection and detection details, and reporting the detection and detection details.

In another preferred embodiment of the present invention the information items are divided into sets, and wherein the security policy depends on the number of detected information items that belong to the same set.

In another preferred embodiment of the present invention each of the sets comprises information items associated with a single individual.

In another preferred embodiment of the present invention the information item comprises a sequence of sub-items.

In another preferred embodiment of the present invention the sub-items are separated by delimiters.

In another preferred embodiment of the present invention a sub-item comprises one of a group comprising: a word, a number, and a character string.

In another preferred embodiment of the present invention the determining comprises using a state machine operable to detect the sequence of delimited sub-items within the information sequence.

In another preferred embodiment of the present invention the transforming comprises:
  applying a first hashing function to assign a respective preliminary hash value to each sub-item within the information item; and
  applying a second hashing function to assigning a global hash value to the information item based on the preliminary hash values of the sub-items.

In another preferred embodiment of the present invention the information sequence comprises sub-sequences, and wherein the determining comprises:
  applying the first hashing function to assign a respective preliminary hash value to each of the sub-sequences;
  applying the second hashing function to at least one of the preliminary hash values to assign a global hash value to the at least one of the sub-sequences; and
  comparing the global hash value to the hash values of the series.

In another preferred embodiment of the present invention the sub-sequences comprise one of a group comprising: a word, a number, and a character string In another preferred embodiment of the present invention the plurality of series comprises a plurality of ordered combinations of sub-sequences within the information or data sequence.

In another preferred embodiment of the present invention the plurality of series comprises a plurality of combinations of sub-sequences within the information or data sequence.

In another preferred embodiment of the present invention the second hash function is invariant to reordering of at least two of the sub-sequences.

In another preferred embodiment of the present invention the method further comprising checking whether the delimited segment was previously stored, and continuing the detection process only if the current delimited segment was previously stored.

According to a second aspect of the present invention, a method for determining the absence of a specified information or data item from a list of information or data items, is presented. The method comprising:
  (a) providing an initialized array of indicators;
  (b) for each member of the list, performing:
  (c) encoding the member with an encoding function to an integer no greater than the size of the array; and
    i. setting a corresponding indicator;
    ii. encoding the specified information or data item with the encoding function; and
    iii. determining the status of an indicator corresponding to the encoded information or data item.

In another preferred embodiment of the present invention a size of the array is greater than the number of items in the list.

In another preferred embodiment of the present invention the encoding function comprises a hashing function.

In another preferred embodiment of the present invention the information item comprises a string of alphanumeric characters.

According to a third aspect of the present invention, a method for determining the absence of a specified information or data item from a list of information or data items is presented. The method comprising:
  (a) providing a plurality initialized array of indicators, each of the arrays being associated with a respective encoding function for encoding a information or data item into an integer no greater than the size of the respective array;
  (b) for each of the arrays, performing:
    (i) encoding each member of the list with the respective encoding function; and
    (ii) setting a corresponding indicator for each of the encoded members;
  (c) encoding the specified information or data item with each of the encoding functions; and, for each of the encoded information or data items, determining the status of the corresponding indicator in the respective array.

In another preferred embodiment of the present invention the size of each of the arrays is greater than the number of items in the list.

In another preferred embodiment of the present invention at least one of the encoding functions comprises a hashing function.

In another preferred embodiment of the present invention the information or data item comprises a string of alphanumeric characters.

In a preferred embodiment of the present invention an apparatus for detecting an information item within an information sequence, the information item being any one of a specified set of information or data items, is presented. The apparatus comprising:

a preprocessor, for transforming the information item into a representation, in accordance with a transformation format; and a scanner, for scanning the information sequence to identify sub-sequences; and a comparator associated with the preprocessor and the scanner, for comparing the representation to the sub-sequences to determine the presence of the specified information item within the information sequence.

In a preferred embodiment of the present invention the apparatus for detecting a specified information item within an information sequence further comprising a user interface for inputting the information items.

In a preferred embodiment of the present invention the apparatus the scanner is further operable to transform the information sequence in accordance with the transformation format.

In a preferred embodiment of the present invention the scanner is further operable to transform the sub-sequences in accordance with the transformation format.

In a preferred embodiment of the present invention the apparatus further comprises an information storage or a database for storing a representation of each information or data item of the set.

In a preferred embodiment of the present invention the information sequence is obtained from a digital medium.

In a preferred embodiment of the present invention the apparatus further comprising a sorter, for forming a sorted list of the respective representations of set of information or data items.

In a preferred embodiment of the present invention the type of the information item comprises one of a group of types comprising: a word, a phrase, a number, a credit-card number, a social security number, a name, an address, an email address, and an account number.

In a preferred embodiment of the present invention the information sequence is provided over a digital traffic channel.

In a preferred embodiment of the present invention the apparatus further comprising retrieving the information sequence from a digital storage medium.

In a preferred embodiment of the present invention the digital storage medium comprises digital storage medium within a proxy server.

In a preferred embodiment of the present invention the apparatus further comprising a non-existence module comprising:

an encoder, for encoding the sub-sequences and the information or data item with an encoding function to respective integers, each of the integers being no greater than the size of the array; and an array setter associated with the encoder, for setting indicators in an array of indicators in accordance with the encoded sub-sequences; and a status checker associated with the encoder and the array setter, for determining the status of an indicator corresponding to the information or data item.

In a preferred embodiment of the present invention the encoding function comprises a hashing function.

The present invention successfully addresses the shortcomings of the presently known configurations by providing a method and system that facilitates fast and efficient detection and identification of a large number of previously stored information and data items, which can efficiently serve digital privacy and confidentiality enforcement as well as knowledge management.

BRIEF DESCRIPTION OF THE DRAWINGS

The invention is herein described, by way of example only, with reference to the accompanying drawings. In the drawings.

DETAILED DESCRIPTION OF PREFERRED EMBODIMENTS

The present invention describes a method and a system for detection of a large number of previously stored information items, such as words, phrases, numbers, credit-card numbers, social security numbers, names, addresses, email addresses, account numbers and other pre-defined strings of characters, within information sequence (such as textual documents) in digital media and electronic traffic (e.g., emails), particularly but not exclusively.

According to a first aspect of the present invention, the method comprises pre-processing of the information items; storing them in a manner that facilitates fast comparison, and then performing sequential analysis of the inspected information sequence, preferably utilizing the delimiters within the information sequence (such as spaces between words) and comparing each of the delimited segment (e.g. each word or sequence of words within a textual document) with the pre-processed information items With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Figure 1:
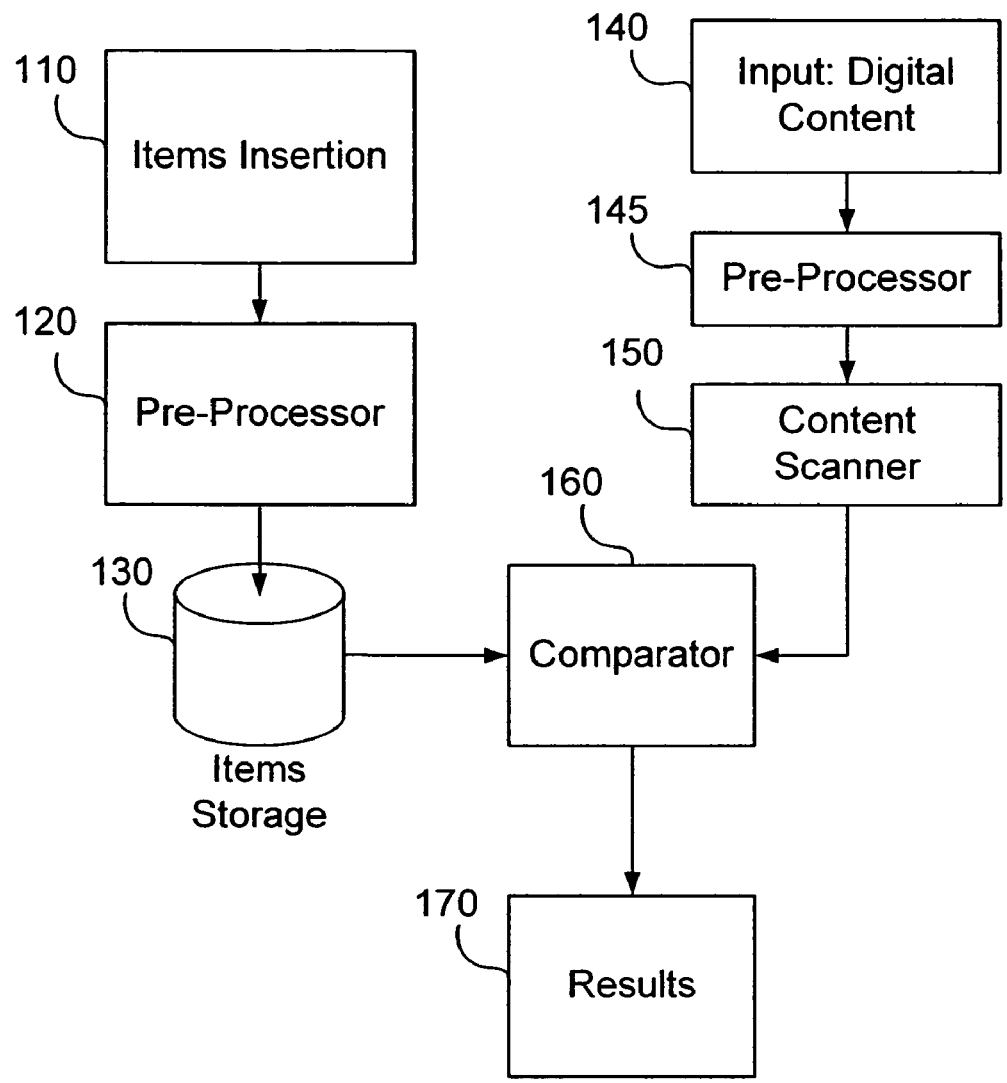
FIG. 1 illustrates a system for fast detection of keywords, constructed and operative according to a preferred embodiment of the present invention.

Reference is now made to FIG. 1, which illustrates a system for fast detection of previously stored information items, such as keywords, numbers and key-phrases, within a digital medium, constructed and operative according to a preferred embodiment of the present invention. The information items insertion module 110 allow user to insert keywords, keyphrases, numbers and character strings, preferably using a graphical user interface (GUI). The items are first pre-processed by the pre-processor 120. In a preferred embodiment of the present invention, the pre-processing comprises transforming the stored information items into a "canonized" form, in which they are represented in a lowercase (or uppercase) Unicode representation. In a preferred embodiment of the present invention, all non-alpha-numeric characters are omitted. In another preferred embodiment of the present invention the pre-processing comprises transforming the stored information items to their base form, whenever possible (e.g., by transforming verbs to "present simple" form, removing suffixes such as "'s" and "ly", reducing to phonetic representation etc.). In another preferred embodiment of the present invention the pre-processing comprises encoding the information items into a numeric representation in a manner that facilitates fast detection, as explained below. In another preferred embodiment of the present invention, the numeric representation depends only on the textual and numeric content of the information item. The pre-processed items are thereafter preferably sorted and stored at the storage 130. A digital content to be analyzed 140 is thereafter preferably pre-processed, as explained below, by the pre-processor 145, and then scanned by the content scanner 150, preferably utilizing the existing delimiters (e.g., spaces between words) in order to facilitate faster scanning. After each delimiter, the comparator 160 efficiently compares the sequence which started at that delimiter (usually a word, a number or a sequence of words and numbers) with the sorted items in the storage 130, preferably using one of the methods and algorithms described below. In a preferred embodiment of the present invention, the storage 130 is a database that facilitates efficient queries.

In a preferred embodiment of the present invention, the information within the digital medium is first pre-processed and transformed into a representation that facilitates fast comparison with the stored information items. In a preferred embodiment of the present invention, the pre-processing comprises transforms that are applied on the to-be-detected information items, such as:

transforming the stored information items into a "canonized" form, in which they are represented in a lowercase (or uppercase) Unicode representation;
omitting all non-alpha-numeric characters;
transforming the stored information items to their base form, whenever possible (e.g., by transforming verbs to "present simple" form, removing suffixes such as "s" and "ly", reducing to phonetic representation etc.);
encoding the information items into a numeric representation in a manner that facilitates fast detection, as explained below.

In a preferred embodiment of the present invention, the digital medium comprises a digital traffic channel, and information items that were found within the digital traffic are then used in order to apply a policy with respect to the traffic within the channel. In a preferred embodiment of the present invention, the digital traffic channel comprises email (both email body messages and attachments), and a policy, such as security policy, is applied with respect to the emails, as described, e.g., in PCT patent application number IL02/00037, in U.S. Patent Application No. 20020129140, filed Dec. 6, 2001, and in U.S. provisional patent application 60/475,492, filled Jun. 4, 2003, the contents of which are hereby incorporated herein by reference in their entirety. In a preferred embodiment of the present invention the security policy comprises actions such as blocking the transmission, logging a record of the detection and detection details, and reporting the detection and its details.

In a preferred embodiment of the present invention, the information items are divided into sets, the security policy depends on the number of detected information items that belong to the same set. These sets may comprise, e.g., information items associated with a single individual, such as her or his name, her or his social security number, her or his address, her or his bank-account number, etc. and the policy may preclude dissemination of any two or more of these items via email.

In a preferred embodiment of the present invention, the digital medium comprises digital storage, and the system is operable to detect information items within the information stored in the storage, e.g., in order to detect keywords and key phrases within a file system or within a proxy server. Such detection can be of importance both for applying a security policy and for information and knowledge management within the organization.

Figure 2:
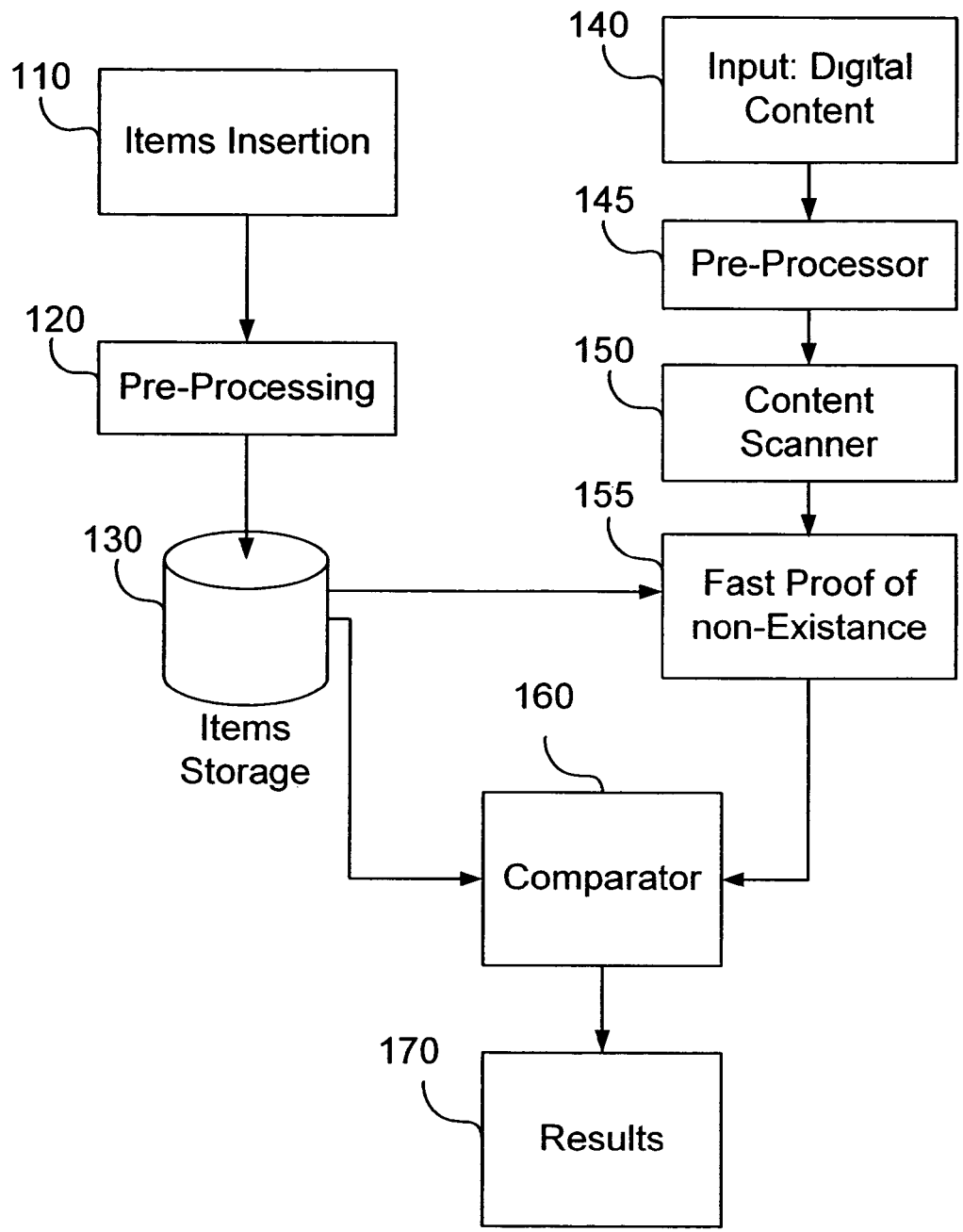
FIG. 2 illustrates a system, substantially similar to the one described in FIG. 1, which also includes a fast-proof of non-existence module.

Reference is now made to FIG. 2, which illustrates a system, substantially similar to the one described in FIG. 1, where a fast proof of non-existence module 155 is introduced between the scanner 150 and the comparator 160. The proof of non-existence module is operable to prove, with a probability P, that a certain item does not exists in the list in the storage 130, thereby significantly reducing the number of queries to the storage 130.

Figure 3:
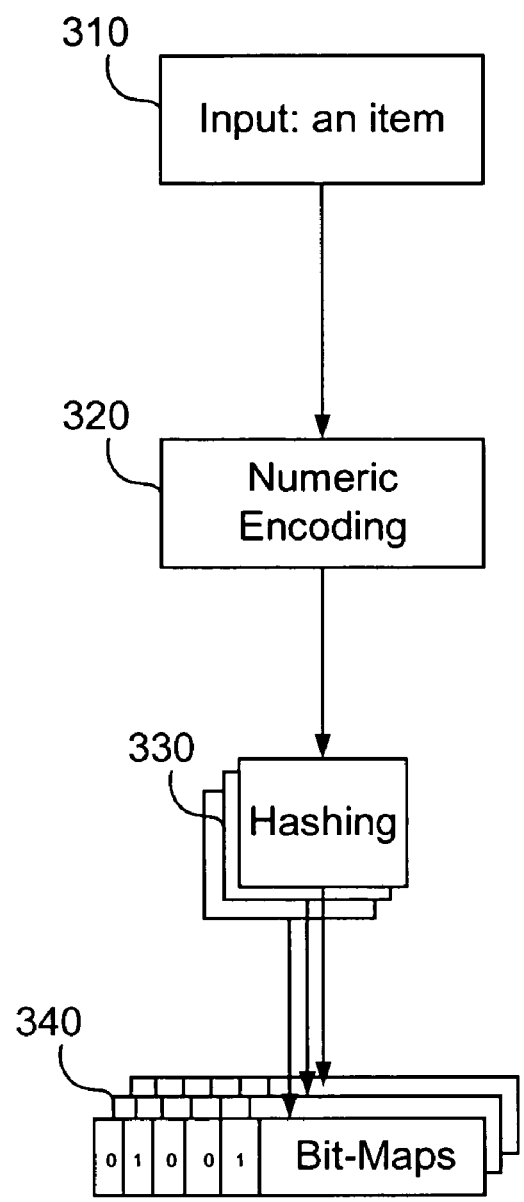
FIG. 3 illustrates a method for fast-proof of non-existence of items in a database, operative according to a preferred embodiment of the present invention.

Reference is now made to FIG. 3, which illustrates a method for proof of non-existence of items in a database, operative according to a preferred embodiment of the present invention. The input item 310 is preferably transformed into a numeric representation, by numeric encoding 320. The numeric representation is then subjected to one or more hash-functions $h_i$ 330 that transform the numeric representation X in stage 320 to an L-bits long number $h_i(x)$, where the distribution of the numbers is preferably close to uniform over the range $1$-$2^L$. Array set 340 contains a corresponding array $a_i$, of length $2^L$, for each of the hash functions $h_i$. The elements of the arrays are bits, which are all initiated to a have a zero value. The element of the array $a_i$ at the address $h_i(x)$ is then set to 1, indicating the existence of the element x.

Since the mapping of elements to addresses in the array is quasi-random, there is always the possibility of collisions between two different items, i.e., that $h_i(x_1)=h_i(x_2)$ while $x_1 \neq x_2$. The probability that at least one event of that kind will happen become close to one when the number of items become substantially greater then the square root of the number of addresses (i.e., $2^{L/2}$), a phenomenon known as the birthday problem. It is therefore not possible to positively indicate the existence of a certain item. However, if there is a 0 in at least one of the corresponding arrays $a_i$, then one can tell for sure that the item does not exist. The method is therefore able to determine the absence of the item from the sequence, but cannot determine the presence of the item in the sequence with 100% certainty. In a preferred embodiment of the present invention, the search is stopped after the first 0 is encountered. Each of the arrays can therefore be considered a filter.

The array's optimal length (and the number of bits in the output of the hash function) is computed based on occupancy, the optimal being 50%, (see discussion below), which requires an array size of approximately 11.42 times the number of items for a single array, and an array size of approximately 1.42 times the number of items in the list times the number of hash functions, for a set of arrays with different hash functions. Each bit for which a respective hashed item exists is given a 1 value (in the first case this is done in the respective array).

Searching for an item is based on the fact that an item can only exist if all the corresponding bits are 1, so a process of computing hash functions and checking respective bits takes place, if any bit is 0, the item is not in the list of data items. When the item's hash value contain more bits then L times the number of arrays, and the different bits are statistically independent, one can simply use "bit masks" as the hash functions (i.e., selecting disjoint groups of bits from the item's hash value), however, if they do not contain enough bits, a more substantially independent scheme, such as a hash function of the basic hash function, is needed (although it might be slightly less efficient).

Following is an analysis illustrating why 50% occupancy is optimal, along with some implementation considerations:

Defining the following parameters:

N: number of items in the database (DB)

L: length of filter arrays (1 bit is assigned to each location in the array)

D=$\log_2$ L: the number of bits required to define a location in the array.

$$P = \frac{N}{L},$$

"density of arrays".

X=number of arrays.

K=XL is the total number of assigned bits.

$$C = \frac{K}{N}$$

the number of total bits per item (the item "cost")

Now, assuming a uniform distribution, the probability of collision with a specific item is $$\frac{1}{L},$$

and since N=PL, the probability of no collisions in an array filter is:

$$\left(1 - \frac{1}{L}\right)^N = \left(1 - \frac{1}{L}\right)^{LP} \to \left(\frac{1}{e}\right)^P = e^{-P}$$

which is the probability of a negative result for a negative input from one array filter. The failure probability of a single array filter is therefore $1-e^{-P}$ And since:

$$L = \frac{K}{X}, P = \frac{N}{L} = \frac{NX}{K} = \frac{X}{C}$$

The total failure probability for X filters is:

$$(1-e^{-P})^X = \left(1-e^{-\frac{NX}{K}}\right)^X = \left(1-e^{-\frac{NX}{K}}\right)^{\frac{NX}{K} \cdot \frac{K}{N}} = \left[\left(1-e^{-\frac{NX}{K}}\right)^{\frac{NX}{K}}\right]^{\frac{K}{N}}$$

Assuming N, K are constant, the minimum of $$\left[\left(1-e^{-\frac{NX}{K}}\right)^{\frac{NX}{K}}\right]^{\frac{K}{N}}$$

is the minimum of $$\left(1-e^{-\frac{NX}{K}}\right)^{\frac{NX}{K}} \text{ at } \frac{NX}{K} = \frac{X}{C} \cong 0.7.$$

And the failure rate is $$\left(1-e^{-\frac{X}{C}}\right)^X = \left[\left(1-e^{-\frac{X}{C}}\right)^{\frac{X}{C}}\right]^C,$$

which at 0.7, is about $0.6^C \cong 0.5^X$ $$\Longrightarrow \frac{X}{C} \cong 0.7 \Rightarrow \frac{C}{X} \cong 1.42$$

$$\Longrightarrow \frac{C}{X} = \frac{K}{NX} = \frac{LX}{NX} = \frac{L}{N} = \frac{1}{P}$$

Which means that the optimal length of each filter array is about 42% longer (in bits) than the number of items in the list.

The probability of a certain bit to be zero is $$\left(1 - \frac{1}{L}\right)^N \cong e^{-P},$$

so P=0.7⇒~50% occupancy for each filter, which again results in failure rate of ~$0.5^X$.

There are two possible cases in which no 0 is encountered during the search process, and a direct query regarding the existence of the item in the storage should be made: the first is the case in which the item do exists in the list, and the second is a "false alarm" due to collisions. In order to minimize the probability of false alarms X should be increased, with the cost of a larger memory footprint. The optimal X is a tradeoff between the memory cost and the cost of accessing the storage.

Because the number of arrays, X, and the number of bits required to define a location in the array, D, are both integers, we should round by assigning the nearest values in the formulas (not by rounding to the nearest, because they are not linear) and choosing the best result.

Note that because of performance issues (cache thrashing) a small first filter might be a good thing regardless, but obviously not small enough to be saturated.

Figure 4:
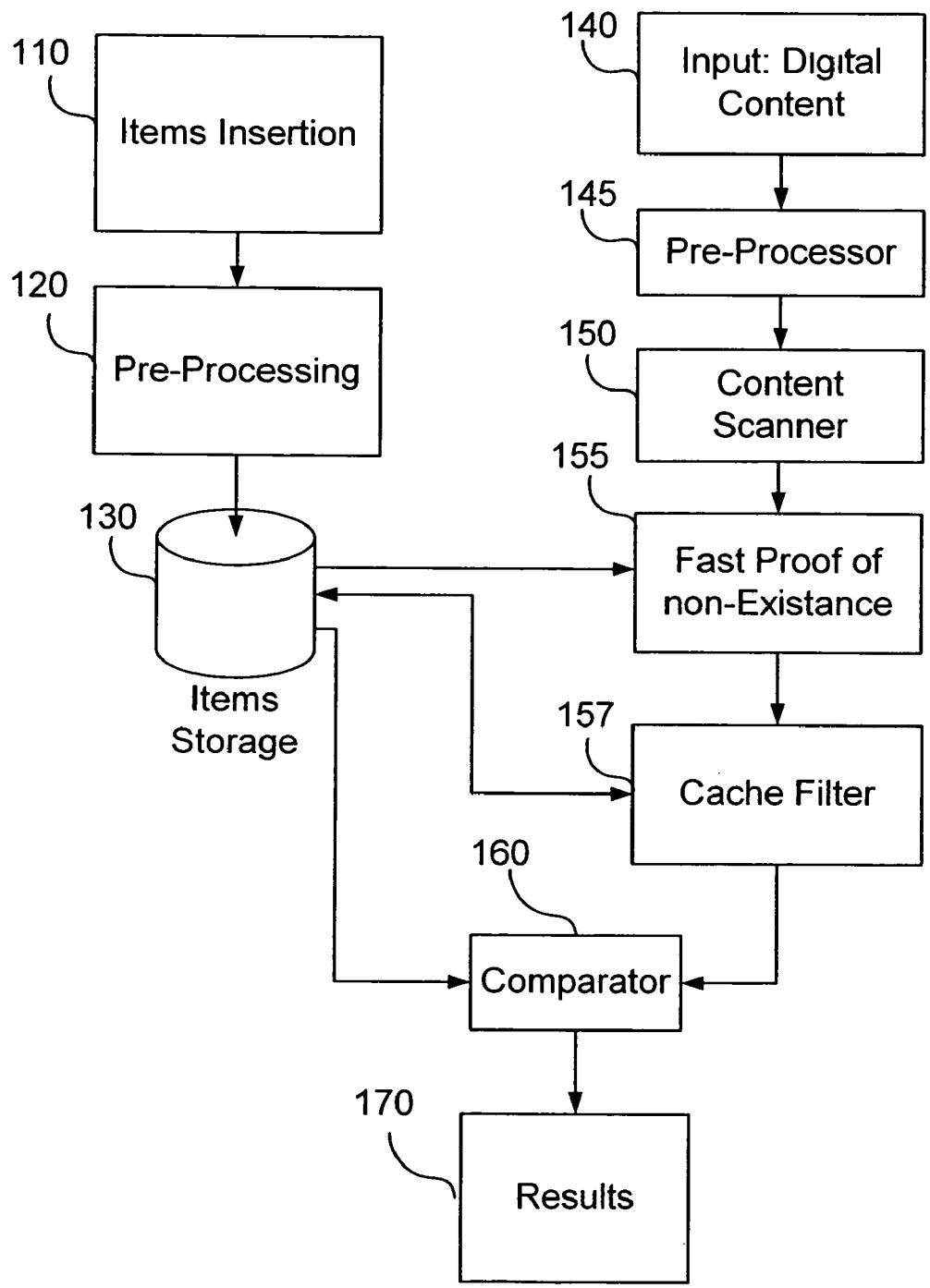
FIG. 4 illustrates a system, substantially similar to the one described in FIG. 2, which also includes a cache filter, operable to filter out a short list of items, and FIG. 5 contains some examples for a tree-based data-structure that facilitates detection of multi-words key-phrases.

In a preferred embodiment of the present invention, the system also utilizes a cash memory that include a short list of common words that are not keywords or essential part of a key-phrase. Reference is now made to FIG. 4, which illustrates a system, substantially similar to the one described in FIG. 2, which also includes a cache filter 157, operable to filter out the short list described above.

In a preferred embodiment of the present invention, the list of information items is sub-divided to several lists, according to the frequencies of accuracy of the items in the list, such that items that are anticipated to appear frequently in the scanned content would appear in a separate list then less frequent items, and a separate non-existence filter is implemented to each of the lists, thereby facilitating optimized resource allocation.

In many cases, the items that need to be detected are sequences of delimited segments, e.g., a sequence of words delimited by spaces (a "key-phrase"). The detection problem in this case is, in general, more involved then single word detection, since a search must be performed for a plurality of sequences of words with a variable length, and can no longer be conducted for each word separately. In the following discussion, for sake of brevity and clarity, we will use the term "word" with respect to any delimited segment of the stored sequence of delimited segments.

Figure 5:
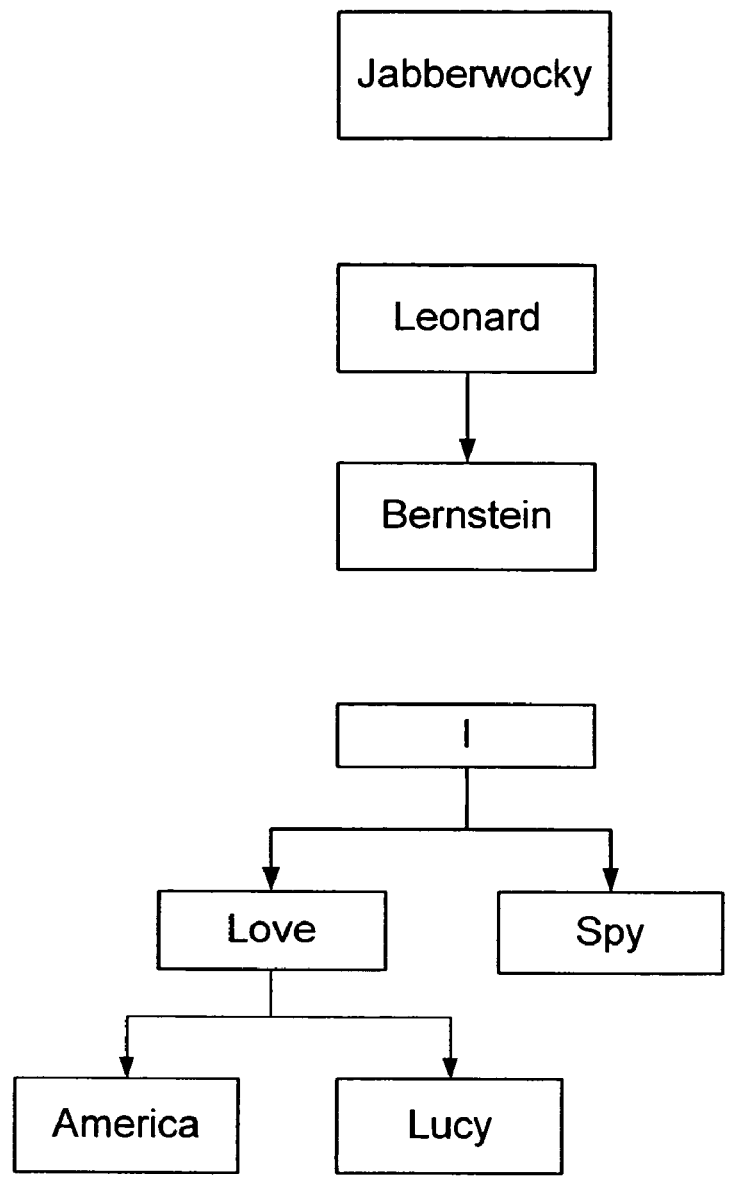

According to a preferred embodiment of the present invention, the first word in each key-phrase is a root of a tree, and the last words are the leaves of the tree (see examples in FIG. 5). Whenever a root word is found, the corresponding tree is traversed in order to detect key-phrases.

In a preferred embodiment of the present invention, identification of key-phrases is based on the following scheme, dubbed Word-Based Hash-List (WBHL). Basically, the algorithm comprises two phases:

Pre-Processing: Each word (or other delimited segment of interest) is represented by its hash value. Each key-phrase is represented by the list or the set of the hashes of its single words. (See more detailed description below)

Scanning and filtering: The algorithm scans the words, evaluates their hash values and utilizes a hash-table for an immediate rule-out of words that are not contained in the key-phrases. If the scanned word belongs to one or more of the key-phrase, the algorithm efficiently check all possible candidates according to the hash values of the successive words. In case of a match, the original key-phrase is retrieved and compared with the scanned item. (See more detailed description below)

This method allow for commutativity, if required (i.e. "John Doe"="Doe, John"), and for rapid clearance in cases where words from the key-phrases are not very common in the analyzed text (a probable scenario). It utilizes the fact that the basic units are words, and not characters, in order to achieve a better performance, compared with classical algorithms such as Boyer-Moore or Rabin-Karp String, as described, e.g., in sections 6.5-6.6 of R. A. Vowels: *Algorithms and Data Structures in F and Fortran*, Unicomp (1999), ISBN 0-9640135-4-1, the contents of which are hereby incorporated herein by reference in their entirety. Furthermore, the performance does not depend on the number key phrases (as long as their constituent words are not common in the analyzed text). Disadvantages of the above scheme may be:

The non-commutative version may be slow if the first word in one or more key-phrase is common (e.g. "the" or "that")

The commutative version may be slow if any word in one or more key-phrase is common The speed issues problem may be avoided by removing common words in the canonization process. The removal may require exact textual matching for avoidance of false positives.

A more detailed description of the algorithm follows:
Key-Phrases Pre-Processing Phase:
  Compute hash value for each word in key phrases.
  Build oneWordsPhrases—a hash table for the hash values of each one-word phrase.
  Build mutiWordsPhrases—a hash table for the hash values of each starting word in multi word phrases.
  Build mutiWordsWords—a hash table for the hash values of each word in multi word phrases.
  For each word in mutiWordsPhrases, add a hash set for each key-phrase containing that word. The hash set contains hashes of all other words in the phrase.
  Associate the set with the text of the key-phrase in oneWordsPhrases and mutiWordsPhrases.
Scanning & Analysis Phase:
Initialization:
  "Canonize" Text
  candidates: an empty set
  i=0
Analysis:
  While i<number of words in the text
    Read Word. W(i)
    Evaluate the hash of W(i) Evaluate Hash: H(W(i)) (e.g., using CRC32)
    Locate H(W(i)) in oneWordsPhrases. (if exists, do textual matching—compare with the actual verbatim)
    if exists:
      For each hash_set in candidates:
        If H(W(i)) not in hash_set,
          delete hash_set
        Else if size(hash_set)=1:
          delete hash_set
          do textual match
        Else
          delete H(W(i)) from hash_set
      Append to candidates all hash_sets associated with H(W(i)) in multiWordsPhrases (They should not contain H(W(I)))
    i=i+1
end The non-commutative version of the algorithm is substantially similar:
Key-Phrases Pre-Processing:
  Compute hash value for each word in key phrases.
  Build oneWordsPhrases—a hash table for the hash values of each one-word phrase.
  Build mutiWordsPhrases—a hash table for the hash values of each starting word in multi word phrases.
  Build mutiWordsWords—a hash table for the hash values of each word in multi word phrases.
  For each word in mutiWordsPhrases, add a hash set for each key-phrase starting with that word. The hash set contains ordered hashes of all other words in the phrase.
  Associate the set with the text of the key-phrase in oneWordsPhrases and mutiWordsPhrases.
Scanning & Analysis Phase:
Initialization:
  "Canonize" Text
  candidates: an empty set
  i=0
Analysis:
  While i<number of words in the text
    Read Word W(i)

Evaluate the hash of W(i) Evaluate Hash: H(W(i)) (e.g., using CRC32)
Locate H(W(i)) in oneWordsPhrases. (if exists, do textual matching—compare with the actual verbatim)
if exists:
    For each hash_set in candidates:
        If H(W(i)) not first of hash_set,
            delete hash_set
        Else if size(hash_set)=1:
            delete hash_set
            do textual match
        Else
            delete H(W(i)) from hash_set
    Append to candidates all hash_sets associated with H(W(i)) in multiWordsPhrases (They should not contain H(W(I)))
i=i+1
end In a preferred embodiment of the present invention, the algorithm used for key-phrase identification comprises:

Pre-Processing phase: Each word is represented by its hash value. Each key-phrase is represented by a commutative (or non-commutative) hash of the hashes of keywords that comprise that key-phrase. The commutative hash is simply the XOR of all the hashes of the words that constitute the phrase.

Scanning and filtering phase: The algorithm scans the words, evaluates the hash values of each word and utilizes a hash-table for an immediate rule-out of words that are not contained in the key-phrases. If the scanned word belongs to one or key-phrase, the algorithm evaluates and checks the commutative hashes of bi-grams, (two consecutive words), three-grams etc.—until the maximum possible number of words in the key-phrases. In case of a match, the original key-phrase is retrieved and compared with against the scanned text.

This scheme also allows for commutativity and fast clearance, and has a better worst-case behavior then the word-based hash-list. It is also easy to implement and to verify, though it may be slightly slower than the word-based hash-list in some cases.

Figure 6:
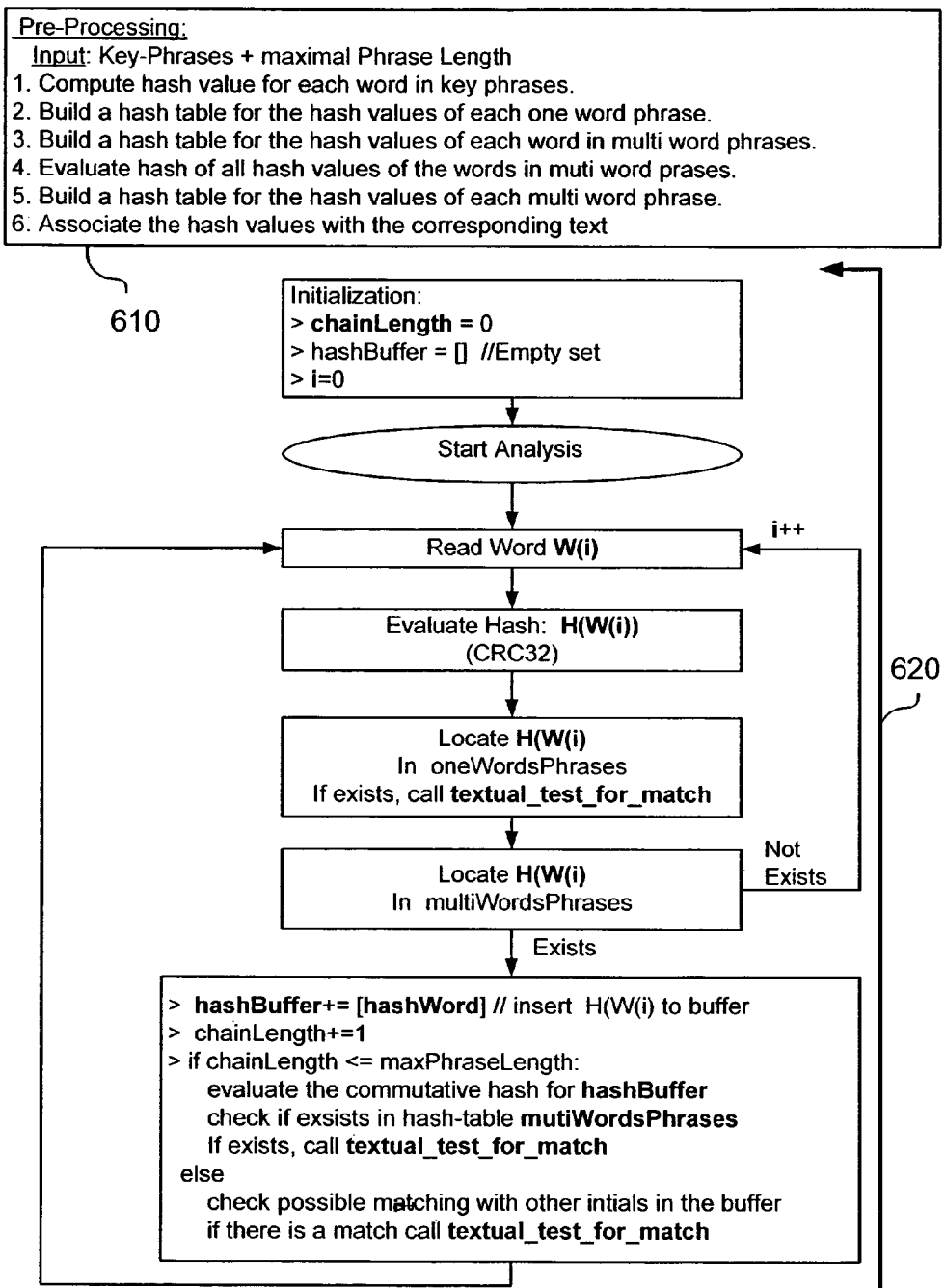
FIG. 6 is a flowchart illustrate algorithm for fast detection of key-phrases, according to preferred embodiment of the present invention.

Reference is now made to FIG. 6, which is a flowchart illustrates the algorithm for fast detection of key-phrases, according to preferred embodiment of the present invention. The key-phrases pre-processing phase, 610, comprises:
Input: Key-Phrases and the Maximal Length of Phrase ("maxPhraseLength")
    Pre-Processing:
    Compute hash value for each word in key phrases.
    Build oneWordsPhrases—a hash table for the hash values of each one-word phrase.
    Build mutiWordsWord—a hash table for the hash values of each word in multi word phrases.
    Evaluate commutativeHash by XORing all the hash values of the words in mutiWordsWord
    Build mutiWordsPhrases—a hash table for the hash values of each multi word phrase.
    Associate the hash values with the text of the key-phrase in oneWordsPhrases and mutiWordsPhrases.
Initialization:
    chainLength=0
    hashBuffer=[ ]//Empty set
    i=0
Analysis:
    While i<number of words in the text
        Read Word W(i)
        Evaluate the hash of W(i): H(W(i)) (e.g., using CRC32)
        Locate H(W(i)) in oneWordsPhrases. (if exists, do textual match)
        if exists:
            hash Buffer+=[hashWord]//insert H(W(i) to buffer
            chainlength+=1
            while chainLength<=maxPhraseLength:
                evaluate the commutative/non-commutative hash for hash Buffer
                check if exists in hash-table mutiWordsPhrases
                if exists,
                      do textual match
                else
                      check possible matching with other initials of mutiWordsPhrases in the buffer
                      if there is a match do textual match
    i=i+1
    end
Input: Key-Phrases and the Maximal Length of Phrase ("maxPhraseLength")
    Pre-Processing:
    Compute hash value for each word in key phrases.
    Build oneWordsPhrases—a hash table for the hash values of each one word phrase.
    Build mutiWordsWord—a hash table for the hash values of each word in multi word phrases.
    Evaluate commutativeHash by XORing all the hash values of the words in mutiWordsWord
    Evaluate nonCommutativeHash, if required, by first adding the numerical value of the index wordLocationInPhrase (which can be just the order of the word in the phrase—"1" for the first word in the phrase, "2" for the second, etc.) to the hash values of the words in mutiWordsWord, and then XORing all the resulted values.
    Build mutiWordsPhrases—a hash table for the hash values of each multi word phrase.
    Associate the hash values with the text of the key-phrase in oneWordsPhrases and mutiWordsPhrases.
The scanning and analysis phase, 620, comprises:
Initialization:
    chainLength=0
    hashBuffer=[ ]//Empty set
    i=0
Analysis:
    While i<number of words in the text
        Read Word W(i)
        Evaluate the hash of W(i) Evaluate Hash: H(W(i)) (e.g., using CRC32)
        Locate H(W(i)) in oneWordsPhrases. (if exists, do textual match)
        if exists:
            hashBuffer+=[hashWord]//insert H(W(i) to buffer
            chainLength+=1
            while chainLength<=maxPhraseLength:
                evaluate the commutative/non-commutative hash for hashBuffer
                check if exists in hash-table mutiWordsPhrases
                if exists,
                      do textual match
                else
                      check possible matching with other initials of mutiWordsPhrases in the buffer
                      if there is a match do textual match
    i=i+1
    end In a preferred embodiment of the present invention, a state-machine, (described, e.g., in David J. Corner, "Digital Logic and State Machine Design", International Thomson Publishing; 3rd edition (June 1997), ISBN: 0030949041, the contents of which is hereby incorporated herein by reference in its entirety) is complied such that each keyword or key-phrase become a regular expression that leave the state-machine in an "accepting state", thereby provide an efficient method to detect both keywords and key-phrases that contain more then one word.

In a preferred embodiment of the present invention, both the items in the inspected documents and the items in the list are sorted, and the comparison is performed between two sorted lists.

In a preferred embodiment of the present invention, the system includes a module that facilitates the automatic insertion of keywords and key-phrase into a keywords list, by comparing close documents with a different policy, and regarding the differences between the documents as a collection of "key-phrases". For example, if in one standard contract the name of on of the sides is "John Doe" and in another contract the name is "Jane Smith" then both "John Doe" and "Jane Smith" can be regarded as key-phrases. A method for comparing documents and obtaining their differences is described, e.g., in provisional patent application No. 60/422,128.

In a preferred embodiment of the present invention, the list of automatically detected keywords is further subjected to manual approval.

The present invention successfully addresses the shortcomings of the presently known configurations by providing a method and system for fast identification of keywords and key-phrases, which can efficiently serve current needs.

It is appreciated that one or more steps of any of the methods described herein may be implemented in a different order than that shown, while not departing from the spirit and scope of the invention.

While the present invention may or may not have been described with reference to specific hardware or software, the present invention has been described in a manner sufficient to enable persons having ordinary skill in the art to readily adapt commercially available hardware and software as may be needed to reduce any of the embodiments of the present invention to practice without undue experimentation and using conventional techniques.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent, or patent application was specifically and individually indicated to be incorporated herein by reference. In addition, citation or identification of any reference in this application shall not be construed as an admission that such reference is available as prior art to the present invention.

What is claimed is:

1. A processor-implemented method for detecting distribution of an information item included within passing information sequences obtained from a digital medium, said information item comprising any one of a specified set of prestored information items whose distribution it is desired to control, comprising:

transforming each item of said set of prestored information items whose distribution it is desired to control from a first representation format into a respective format facilitating a first comparison, said first comparison being fast in relation to a second relatively slower textual comparison, in accordance with a predetermined transformation format, said predetermined transformation format being preservative of meaning;

transforming passing information sequences, obtained from said digital medium, into said format facilitating said first relatively fast comparison in accordance with said transformation format;

determining the presence of one or more of said prestored information items within said transformed information sequence, said determining comprising:

comparing respective information sequences in said format facilitating said relatively fast comparison with said prestored information items in said format facilitating said relatively fast comparison;

when a match is found between said formats facilitating said relatively fast comparison then carrying out said second relatively slower textual comparison between said respective prestored information item in said first representation format and a respective information sequence obtained from said digital medium, and when a match is found using said second relatively slower textual comparison, applying a policy to control distribution of said respective information sequence.

2. A processor-implemented method according to claim 1, further comprising storing said representations in a database.

3. A processor-implemented method according to claim 1, further comprising sorting said representations into a sorted list.

4. A processor-implemented method according to claim 3, wherein said sorting is in accordance with a tree sorting algorithm.

5. A processor-implemented method according to claim 1, wherein said information item comprises a single word.

6. A processor-implemented method according to claim 1, wherein said information item comprises a sequence of words.

7. A processor-implemented method according to claim 1, wherein said information item comprises a delimited sequence of sub-items.

8. A processor-implemented method according to claim 7, wherein each of said sub-items comprises a sequence of alphanumeric characters.

9. A processor-implemented method according to claim 1, wherein a type of said information item comprises one of a group of types comprising:

a word, a phrase, a number, a credit-card number, a social security number, a name, an address, an email address, and an account number.

10. A processor-implemented method according to claim 1, wherein said information sequence is provided over a digital traffic channel.

11. A processor-implemented method according to claim 10, wherein said digital traffic channel comprises one of a group of channels comprising:

email, instant messaging, peer-to-peer network, fax, and a local area network.

12. A processor-implemented method according to claim 1, wherein said information sequence comprises the body of an email.

13. A processor-implemented method according to claim 1, wherein said information sequence comprises an email attachment.

14. A processor-implemented method according to claim 1, further comprising retrieving said information sequence from a digital storage medium.

15. A processor-implemented method according to claim 14, wherein said digital storage medium comprises a digital cache memory.

16. A processor-implemented method according to claim 1, wherein said representation depends only on the textual and numeric content of the information item.

17. A processor-implemented method according to claim 1, wherein said transforming into a format that facilitates fast comparison comprises Unicode encoding.

18. A processor-implemented method according to claim 1, wherein said transforming into a format that facilitates fast comparison comprises converting all characters to upper-case characters or to lower-case characters.

19. A processor-implemented method according to claim 1, wherein said transforming into a format that facilitates fast comparison comprises encoding an information item into a numeric representation.

20. A processor-implemented method according to claim 1, wherein said transforming into a format that facilitates fast comparison comprises applying a first hashing function to said representations.

21. A processor-implemented method according to claim 1, wherein said information sequence comprises sub-sequences.

22. A processor-implemented method according to claim 21, wherein said sub-sequences are separated by delimiters.

23. A processor-implemented method according to claim 22 wherein said sub-sequences separated by delimiters are any of: words; names, and numbers.

24. A processor-implemented method according to claim 23, further comprising scanning said information sequence to identify said sub-sequences.

25. A processor-implemented method according to claim 24, and said determining is performed by matching said information item to an ordered series of said sub-sequences.

26. A processor-implemented method according to claim 1, wherein said policy is a security policy, said security policy comprises at least one of the following group of security policies: blocking said transmission, logging a record of said detection and detection details, and reporting said detection and detection details.

27. A processor-implemented method according to claim 26, wherein said information items are divided into sets, and wherein said security policy depends on the number of detected information items that belong to the same set.

28. A processor-implemented method according to claim 27 wherein each of said sets comprises information items associated with a single individual.

29. A processor-implemented method according to claim 1, wherein said information item comprises a sequence of sub-items.

30. A processor-implemented method according to claim 29, wherein said sub-items are separated by delimiters.

31. A processor-implemented method according to claim 29, wherein a sub-item comprises one of a group comprising: a word, a number, and a character string.

32. A processor-implemented method according to claim 29, wherein said determining comprises using a state machine operable to detect said sequence of delimited sub-items within said information sequence.

33. A processor-implemented method according to claim 29, wherein said transforming into a format facilitating fast comparison comprises:
applying a first hashing function to assign a respective preliminary hash value to each sub-item within said information item; and
applying a second hashing function to assigning a global hash value to said information item based on said preliminary hash values of said sub-items.

34. A processor-implemented method according to claim 33, wherein said information sequence comprises sub-sequences, and wherein said determining comprises:
applying said first hashing function to assign a respective preliminary hash value to each of said sub-sequences;
applying said second hashing function to at least one of said preliminary hash values to assign a global hash value to said at least one of said sub-sequences; and
comparing said global hash value to hash values of said sub-sequences.

35. A processor-implemented method according to claim 34, wherein said sub-sequences comprise one of a group comprising: a word, a number, and a character string.

36. A processor-implemented method according to claim 34, wherein said sub-sequences comprise a plurality of ordered combinations of sub-sequences within said data sequence.

37. A processor-implemented method according to claim 35, wherein said sub-sequences comprise a plurality of combinations of sub-sequences within said data sequence.

38. A processor-implemented method according to claim 37, wherein said second hash function is invariant to reordering of at least two of said sub-sequences.

39. A processor-implemented method according to claim 38, further comprising checking whether a delimited segment was previously stored, and continuing said detection process only if a current delimited segment was previously stored.

40. An apparatus for detecting an information item included within passing information sequences obtained from a digital medium, said information item comprising any one of a specified set of prestored data items whose distribution it is desired to control, comprising:
a preprocessor, configured for transforming each item of said prestored information items from a first representation format into a respective format facilitating a first comparison, said first comparison being fast in relation to a second relatively slower textual comparison, in accordance with a predetermined transformation format, said predetermined transformation format being preservative of meaning;
a scanner, configured for transforming passing information sequences, obtained from said digital medium, into said format facilitating said first relatively fast comparison in accordance with said transformation format; and
a comparator associated with said preprocessor and said scanner, configured for determining the presence of one or more of said prestored information items within said transformed information sequence by:
comparing respective information sequences in said format facilitating said relatively fast comparison with said prestored information items in said format facilitating said relatively fast comparison, and
wherever a match is found between said formats facilitating said relatively fast comparison, then carrying out said second relatively slower textual comparison between said respective prestored information item in said first representation format and a respective information sequence obtained from said digital medium, to make a second determination of a match,
the apparatus being configured to apply a policy for controlling distribution of said respective information sequence when said second match is detected.

41. An apparatus for detecting a specified information item within an information sequence according to claim 40, further comprising a user interface configured for inputting said information items.

42. An apparatus for detecting a specified information item within an information sequence according to claim 40, further comprising a sorter configured for forming a sorted list of the respective representations of set of data items.

43. An apparatus for detecting a specified information item within an information sequence according to claim 40, further comprising a database configured for storing a representation of each data item of said set.

44. An apparatus for detecting a specified information item within an information sequence according to claim 40, wherein a type of said information item comprises one of a group of types comprising: a word, a phrase, a number, a credit-card number, a social security number, a name, an address, an email address, and an account number.

45. An apparatus for detecting a specified information item within an information sequence according to claim 40, wherein said information sequence is provided over a digital traffic channel.

46. An apparatus for detecting a specified information item within an information sequence according to claim 40, wherein said scanner is further configured for retrieving said information sequence from a digital storage medium.

47. An apparatus for detecting a specified information item within an information sequence according to claim 46, wherein said digital storage medium comprises digital storage medium within a proxy server.

48. An apparatus for detecting a specified information item within an information sequence according to claim 40, wherein said encoding function comprises a hashing function.

49. A processor-implemented method according to claim 2, wherein said transforming said representation and storage of said information items comprises:
 a) assigning a hash value to each delimited segment within said information item;
 b) assigning a hash value for said information item based on said hashes assigned to delimited segments within said information item;
 c) storing said hash values evaluated in step a) and step b) above;
and wherein detecting said information items within said digital medium comprises:
 d) assigning a hash value to each delimited segment within said digital medium utilizing the same hash function used in step a) above;
 e) assigning a hash value for sequences of delimited segments utilizing the same hash function used in step b) above, said sequences being of pluralities of possible numbers of delimited segments within said information items;
 f) comparing the hashes values evaluated in step e) above with said hash values stored in step e) above.

* * * * *